United States Patent
Watada et al.

(10) Patent No.: US 11,951,933 B2
(45) Date of Patent: Apr. 9, 2024

(54) WEBBING SUPPORT DEVICE

(71) Applicant: KABUSHIKI KAISHA TOKAI-RIKA-DENKI-SEISAKUSHO, Aichi (JP)

(72) Inventors: Yusuke Watada, Aichi (JP); Shota Okuyama, Aichi (JP); Shigeki Yoshida, Aichi (JP)

(73) Assignee: KABUSHIKI KAISHA TOKAI-RIKA-DENKI-SEISAKUSHO, Aichi (JP)

(*) Notice: Subject to any disclaimer, the term of this patent is extended or adjusted under 35 U.S.C. 154(b) by 35 days.

(21) Appl. No.: 17/621,162

(22) PCT Filed: Jul. 3, 2020

(86) PCT No.: PCT/JP2020/026241
§ 371 (c)(1),
(2) Date: Dec. 20, 2021

(87) PCT Pub. No.: WO2021/002463
PCT Pub. Date: Jan. 7, 2021

(65) Prior Publication Data
US 2022/0355761 A1  Nov. 10, 2022

(30) Foreign Application Priority Data

Jul. 4, 2019  (JP) .................................. 2019-125362

(51) Int. Cl.
*B60R 22/20* (2006.01)
*B60R 22/03* (2006.01)
(Continued)

(52) U.S. Cl.
CPC .............. *B60R 22/26* (2013.01); *B60R 22/03* (2013.01); *B60R 22/20* (2013.01); *B60R 2022/1806* (2013.01)

(58) Field of Classification Search
CPC . B60R 22/20; B60R 22/201; B60R 2022/021; B60R 2022/1806; B60R 2022/208; B60R 22/03; B60R 22/26
See application file for complete search history.

(56) References Cited

U.S. PATENT DOCUMENTS 4,765,651 A * 8/1988 Unger ................... B60R 22/023
74/89.14
5,072,969 A * 12/1991 Kamiyama ........... B60R 22/201
280/801.2
(Continued)

FOREIGN PATENT DOCUMENTS

DE          19536951 A1 *  4/1997   ........... B60N 2/4221
DE     102005021281 A1 * 11/2006   ............. B60R 22/03
(Continued)

*Primary Examiner* — Barry Gooden, Jr.
(74) *Attorney, Agent, or Firm* — Studebaker & Brackett PC

(57) ABSTRACT

In a lift-up buckle device, a worm wheel is engaged with a screw drive. When a worm is rotated in a forward direction and causes the screw drive to move downward, the worm moves the worm wheel downward. On the other hand, when the worm is rotated in a reverse direction and causes the screw drive to move upward, the worm moves the worm wheel upward. Consequently, the worm wheel may be stably engaged with the screw drive, and the worm wheel and worm may be stably mated.

7 Claims, 4 Drawing Sheets

(51) Int. Cl.
*B60R 22/26* (2006.01)
*B60R 22/18* (2006.01)

(56) References Cited

U.S. PATENT DOCUMENTS

| | | | | |
|---|---|---|---|---|
| 5,125,686 | A * | 6/1992 | Yano | F16H 57/0497 |
| | | | | 297/483 |
| 7,997,620 | B1 * | 8/2011 | Dong | B60R 22/03 |
| | | | | 280/805 |
| 2008/0290644 | A1 | 11/2008 | Spahn et al. | |
| 2015/0307060 | A1 * | 10/2015 | Arnold | B60R 22/201 |
| | | | | 297/469 |
| 2016/0121844 | A1 * | 5/2016 | Holbein | A44B 11/2503 |
| | | | | 24/683 |
| 2017/0210336 | A1 * | 7/2017 | Watada | A44B 11/2561 |
| 2017/0232927 | A1 * | 8/2017 | Murasaki | B60R 22/20 |
| | | | | 24/593.1 |
| 2017/0253214 | A1 * | 9/2017 | Klaassen | B60R 22/20 |
| 2017/0297527 | A1 * | 10/2017 | Ots | B60R 22/03 |
| 2018/0056930 | A1 * | 3/2018 | Murasaki | B60R 22/03 |
| 2018/0056932 | A1 * | 3/2018 | Murasaki | B60R 22/20 |
| 2018/0202523 | A1 * | 7/2018 | Matsuzaki | F16H 25/20 |
| 2020/0189517 | A1 * | 6/2020 | Matsuzaki | B60R 22/201 |

FOREIGN PATENT DOCUMENTS

| | | | | |
|---|---|---|---|---|
| DE | 102014223045 A1 * | 5/2016 | | B60R 22/03 |
| DE | 102017119238 A1 * | 3/2018 | | B60R 22/03 |
| GB | 2190278 A * | 11/1987 | | B60R 22/023 |
| JP | S51-088756 U | 7/1976 | | |
| JP | 2002-166789 A | 6/2002 | | |
| JP | 2010-023688 A | 2/2010 | | |
| JP | 2011-168098 A | 9/2011 | | |
| JP | 2018034791 A * | 3/2018 | | B60R 22/03 |
| JP | 2019-017527 A | 2/2019 | | |
| JP | 2020-131980 A | 8/2020 | | |
| KR | 20180005041 A * | 1/2018 | | B60R 22/20 |
| WO | WO-2013045027 A1 * | 4/2013 | | B60R 22/03 |

* cited by examiner

FIG.4

|  | BUCKLE RETRACTION | BUCKLE PROJECTION |
|---|---|---|
| WORM ROTATION | REVERSE DIRECTION | FORWARD DIRECTION |
| WORM WHEEL MOVEMENT | UPWARD | DOWNWARD |
| SCREW DRIVE MOVEMENT | UPWARD | DOWNWARD |

WEBBING SUPPORT DEVICE

CROSS-REFERENCE TO RELATED APPLICATIONS

The present application is a U.S. National Phase of PCT/JP2020/026241 filed on Jul. 3, 2020, claiming priority under 35 USC 119 from Japanese Patent Application No. 2019-125362 filed Jul. 4, 2019, the disclosure of which is incorporated by reference herein.

TECHNICAL FIELD

The present invention relates to a webbing support device that enables a support portion to support a webbing.

BACKGROUND ART

In a seatbelt device recited in Japanese Patent Application Laid-Open (JP-A) No. 2010-023688, a tongue of a webbing belt is attachable to a buckle, the buckle is connected with a slider, and the slider is engaged by threading with a rotary shaft. A rotary gear is fixed to the rotary shaft, and an output gear is mated with the rotary gear. When the output gear rotates, the rotary gear and rotary shaft rotate integrally and the buckle is moved.

If the rotary gear of this seatbelt device is replaced with a worm wheel and the output gear is replaced with a worm, it is preferable that the worm wheel and worm can be stably mated.

SUMMARY OF INVENTION

Technical Problem

In consideration of the circumstances described above, an object of the present invention is to provide a webbing support device in which a worm wheel and a worm may be stably mated.

Solution to Problem

A webbing support device according to a first aspect of the present invention includes: a support portion configured to support a webbing to be applied to an occupant; an engaging body connected with the support portion; a worm wheel engaged with the engaging body; and a worm mated with the worm wheel, rotation of the worm causing the worm wheel to rotate and, via the engaging body, causing the support portion to move, when a movement force to one axial direction side of the worm wheel is to act on the engaging body from a support portion side, a movement force to the one axial direction side being caused to act on the worm wheel by the rotation of the worm, and when a movement force to another axial direction side of the worm wheel is to act on the engaging body from the support portion side, a movement force to the other axial direction side being caused to act on the worm wheel by the rotation of the worm.

In a webbing support device according to a second aspect of the present invention, in the webbing support device according to the first aspect of the present invention, the engaging body stops a movement in an axial direction of the worm wheel by the worm.

In a webbing support device according to a third aspect of the present invention, the webbing support device according to the first aspect or second aspect of the present invention further includes a stopping body that supports the engaging body and stops a movement in an axial direction of the worm wheel by the worm.

In a webbing support device according to a fourth aspect of the present invention, the webbing support device according to any one of the first to third aspects of the present invention further includes a moving body that is connected with the support portion and engaged by threading with the engaging body, the moving body being moved and moving the support portion when the worm wheel is rotated and rotates the engaging body.

Advantageous Effects of Invention

In the webbing support device according to the first aspect of the present invention, the support portion is configured to support the webbing applied to the occupant, the engaging body is connected with the support portion, and the worm wheel is engaged with the engaging body. The worm is mated with the worm wheel. Thus, when the worm is rotated, the worm wheel is rotated and, via the engaging body, the support portion is moved.

In this aspect, when the movement force to the one axial direction side of the worm wheel is acting on the engaging body from the support portion side, rotation of the worm causes the movement force to the one axial direction side to act on the worm wheel. When the movement force to the other axial direction side of the worm wheel is acting on the engaging body from the support portion side, rotation of the worm causes the movement force to the other axial direction side to act on the worm wheel. Consequently, when the movement force to the one axial direction side is acting on the worm wheel and when the movement force to the other axial direction side is acting on the worm wheel, the worm wheel may be stably engaged with the engaging body, and the worm wheel and worm may be stably mated.

In the webbing support device according to the second aspect of the present invention, the engaging body stops movement in the axial direction of the worm wheel by the worm. Therefore, a requirement to separately provide a member that stops the movement in the axial direction of the worm wheel may be moderated, and structure may be simplified.

In the webbing support device according to the third aspect of the present invention, the stopping body supports the engaging body and the stopping body stops movement in the axial direction of the worm wheel by the worm. Therefore, a requirement to separately provide a member that stops the movement in the axial direction of the worm wheel may be moderated, and structure may be simplified.

In the webbing support device according to the fourth aspect of the present invention, the moving body is connected with the support portion, and the moving body is engaged by threading with the engaging body. Thus, when the worm wheel rotates and the engaging body is rotated, the moving body is moved and the support portion is moved. Therefore, there is no need to move the engaging body in the axial direction to move the support portion. Thus, space needed for arrangement of the engaging body may be reduced.

BRIEF DESCRIPTION OF DRAWINGS

FIG. 4 is a table showing rotation directions of a worm, movement directions of a worm wheel and movement directions of a screw drive when the buckle of the lift-up buckle device according to the exemplary embodiment of the present invention is being retracted and when the buckle is being projected.

DETAILED DESCRIPTION

Figure 1:
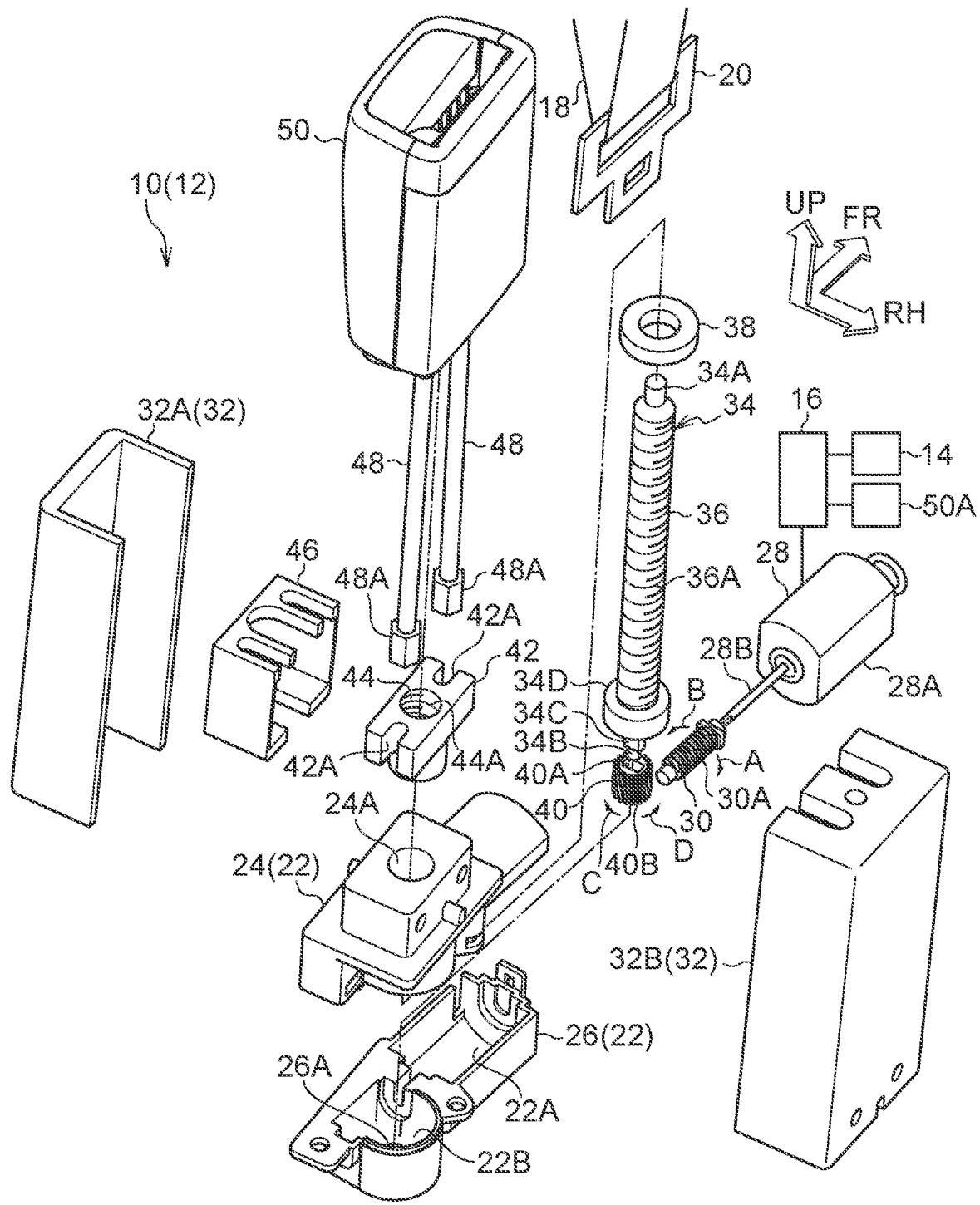
FIG. 1 is an exploded perspective view, seen diagonally from rear right, showing a lift-up buckle device according to an exemplary embodiment of the present invention.

FIG. 1 is an exploded perspective view, seen diagonally from rear right, showing a lift-up buckle device 10 that serves as a webbing support device according to an exemplary embodiment of the present invention. In the drawings, forward of the lift-up buckle device 10 is indicated by an arrow FR, rightward of the lift-up buckle device 10 is indicated by an arrow RH, and upward of the lift-up buckle device 10 is indicated by an arrow UP.

As shown in FIG. 1, the lift-up buckle device 10 according to the present exemplary embodiment structures a seatbelt apparatus 12 of a vehicle (an automobile). The seatbelt apparatus 12 is employed at a seat (not shown in the drawings) in a passenger compartment. A sitting sensor 14 is provided at the seat. The sitting sensor 14 detects when an occupant of the vehicle is sitting on the seat, and is electronically connected to a control device 16.

The seatbelt apparatus 12 is equipped with a take-up device (not shown in the drawings). The take-up device is fixed at the lower side at a vehicle width direction outer side of a seat rear portion. A webbing 18 in a long, narrow belt shape (a seatbelt) is taken up onto the take-up device, starting from a proximal end side of the seatbelt. The webbing 18 can be pulled out from the take-up device. An urging mechanism is provided at the take-up device. The urging mechanism urges the webbing 18 to the side at which the webbing 18 is taken up onto the take-up device. A lock mechanism is provided at the take-up device. At a time of emergency of the vehicle (for example, at a time of collision), the lock mechanism locks pulling out of the webbing 18 from the take-up device.

At a distal end side of the webbing 18 relative to the take-up device, the webbing 18 movably penetrates through a through-anchor (not shown in the drawings). The through-anchor is supported at the upper side at the vehicle width direction outer side of the seat rear portion. The distal end of the webbing 18 is fixed to an anchor (not shown in the drawings), which is fixed at the lower side at the vehicle width direction outer side of the seat rear portion. Between the through-anchor and the anchor, the webbing 18 movably penetrates through a tongue 20 that serves as an intermediate member.

The lift-up buckle device 10 is fixed at the lower side at the vehicle width direction inner side of the seat rear portion. Front, right and upper sides of the lift-up buckle device 10 are oriented to, respectively, the front or rear side, vehicle width direction outer side and upper side of the vehicle.

Figure 2:
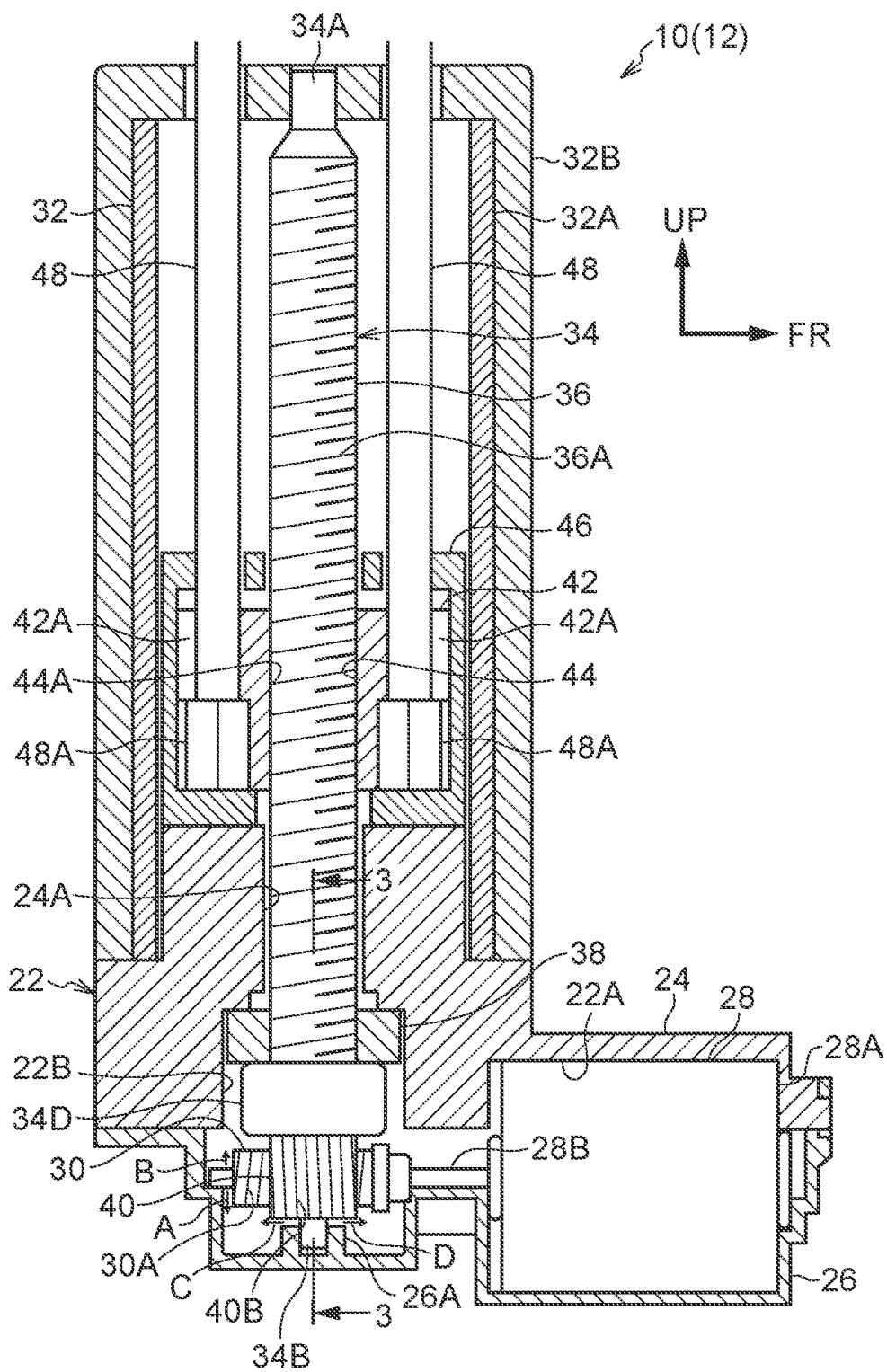
FIG. 2 is a sectional diagram, seen from the right, showing the lift-up buckle device according to the exemplary embodiment of the present invention.

As shown in FIG. 1 and FIG. 2, a substantially box-shaped case 22 that serves as an accommodation body is provided at the lift-up buckle device 10. A housing 24 fabricated of a metal is provided at an upper side of the case 22 and a cover 26 fabricated of a resin is provided at the lower side of the case 22. The housing 24 serves as a stopping member and the cover 26 serves as a stopping body. The case 22 is structured by assembly of the housing 24 to the cover 26. The lift-up buckle device 10 is disposed at a vehicle body side by the housing 24 being fixed to the vehicle body side.

An accommodation chamber 22A in a substantially cuboid shape is formed in a front side part of the case 22. The accommodation chamber 22A is formed between the housing 24 and the cover 26. An axial direction of the accommodation chamber 22A is arranged to be parallel with the front-and-rear direction.

A support chamber 22B in a substantially cylindrical shape is formed in a rear side part of the case 22. The support chamber 22B is formed between the housing 24 and the cover 26. An axial direction of the support chamber 22B is arranged to be parallel with the vertical direction. A stop tube 26A in a circular tube shape is integrally formed at a lower wall of the support chamber 22B (a lower wall of the cover 26). The stop tube 26A serves as a first stopping portion. The stop tube 26A is arranged to be coaxial with the support chamber 22B, and the interior of the stop tube 26A is open to the upper side thereof. A penetrating hole 24A in a substantially cylindrical shape is formed penetrating through an upper wall of the support chamber 22B (an upper wall of the housing 24). The penetrating hole 24A is arranged to be coaxial with the support chamber 22B, and a diameter of the penetrating hole 24A is smaller than a diameter of the support chamber 22B.

A motor main body 28A of a motor 28 that serves as a driving device is accommodated in the accommodation chamber 22A of the case 22. The motor main body 28A is tightly fitted into and fixed in the accommodation chamber 22A. An output shaft 28B of the motor 28 protrudes rearward from the motor main body 28A. The output shaft 28B protrudes from the accommodation chamber 22A of the case 22 into the support chamber 22B to be rotatable. The motor 28 is electronically connected to the control device 16. Under the control of the control device 16, the motor 28 is driven forward and driven in reverse, and the output shaft 28B is rotated in, respectively, a forward direction (the direction of arrow A in FIG. 1 and the like) and a reverse direction (the direction of arrow B in FIG. 1 and the like).

A worm 30 fabricated of a resin is coaxially supported at the output shaft 28B. The worm 30 is disposed in the support chamber 22B of the case 22 and is rotatable integrally with the output shaft 28B. The worm 30 is slidable in an axial direction relative to the output shaft 28B. Sliding of the worm 30 in the axial direction may be stopped by a front wall and a rear wall of the support chamber 22B. A worm tooth 30A in a helical shape is coaxially formed at the outer periphery of the worm 30. The worm tooth 30A is angled in a direction toward the rear in the forward direction.

A rail 32 in a substantially cuboid box shape that is fabricated of a resin is fixed to the upper side of the case 22. The rail 32 is disposed to be coaxial with the support chamber 22B of the case 22. A rail main body 32A, with a "U"-shaped plate shape in cross section, is provided at the left side of the rail 32. A rail cover 32B in a substantially cuboid box shape is provided at the right side of the rail 32.

The interior of the rail cover 32B is open to the left side. In a state in which the rail main body 32A is tightly fitted into the rail cover 32B, the rail main body 32A and the rail cover 32B are assembled to structure the rail 32. The interior of the rail cover 32B is open to the lower side. Thus, the interior of the rail 32 is open to the lower side and is in communication with the support chamber 22B via the penetrating hole 24A in the case 22.

A screw drive 34 in a substantially circular rod shape that is fabricated of a metal is provided coaxially in the support chamber 22B of the case 22, in the penetrating hole 24A and in the rail 32. The screw drive 34 serves as an engaging body. The screw drive 34 is rotatable in a projecting direction (the direction of arrow C in FIG. 1 and the like) and in a retracting direction (the direction of arrow D in FIG. 1 and the like). An upper shaft 34A in a circular rod shape is coaxially formed at an upper end portion of the screw drive 34. The upper shaft 34A is supported at an upper wall of the rail 32 to be rotatable and movable in the axial direction. A lower shaft 34B in a circular rod shape is formed coaxially at a lower end portion of the screw drive 34. The lower shaft 34B is tightly fitted into the stop tube 26A of the support chamber 22B and is supported at the stop tube 26A to be rotatable and movable in the axial direction. An axial direction dimension of the lower shaft 34B is greater than an axial direction dimension of the stop tube 26A. Downward movement of the screw drive 34 causes a lower face of the lower shaft 34B to abut against and be stopped at the lower wall of the support chamber 22B (see FIG. 3B).

Figure 3A:
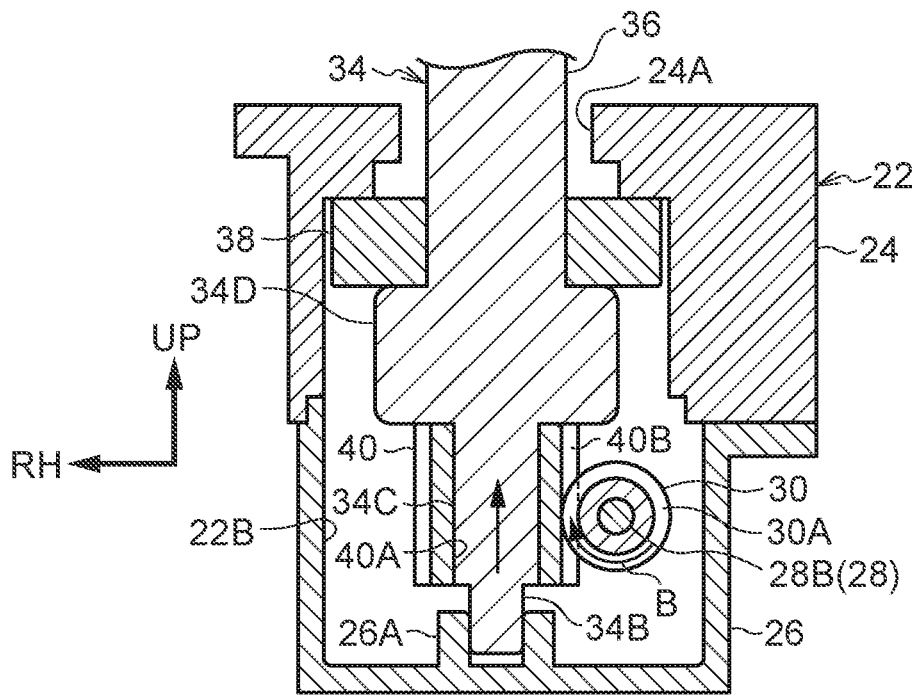
FIG. 3A is a sectional diagram seen from the front (a sectional diagram taken along line 3-3 in FIG. 2), showing principal portions of the lift-up buckle device according to the exemplary embodiment of the present invention when a buckle of the lift-up buckle device is being retracted.

An engaging shaft 34C in a substantially rectangular rod shape (see FIG. 3A) is formed coaxially at the screw drive 34 just above the lower shaft 34B. The engaging shaft 34C serves as an engaged portion. A minimum diameter of the engaging shaft 34C is greater than a diameter of the lower shaft 34B. The engaging shaft 34C is disposed to the left of the worm 30. A flange 34D in a circular rod shape is formed coaxially at the screw drive 34 just above the engaging shaft 34C. The flange 34D serves as a second stopping portion. A diameter of the flange 34D is greater than a maximum diameter of the engaging shaft 34C.

A screw 36 in a substantially circular rod shape is formed coaxially at the screw drive 34 between the upper shaft 34A and the flange 34D. A maximum diameter of the screw 36 is larger than a diameter of the upper shaft 34A and is smaller than the diameter of the flange 34D. A helical thread ridge 36A is formed coaxially at the outer periphery of the screw 36. The thread ridge 36A is angled in a direction to downward in the projecting direction.

At a lower end portion of the screw 36, the screw drive 34 coaxially penetrates through and is tightly fitted into a spacer 38 in a circular tube shape that is fabricated of a resin. Downward movement of the spacer 38 relative to the screw drive 34 is stopped by the flange 34D of the screw drive 34. The spacer 38 is disposed in the support chamber 22B of the case 22. Thus, upward movement of the spacer 38 is stopped by a region of the upper wall of the support chamber 22B surrounding the penetrating hole 24A, and upward movement of the screw drive 34 is stopped.

A worm wheel 40 fabricated of a resin (a helical gear) is coaxially engaged with the engaging shaft 34C of the screw drive 34. An axial direction dimension of the worm wheel 40 is equal to an axial direction dimension of the engaging shaft 34C (see FIG. 3A). An engaging hole 40A in a substantially rectangular column shape is formed penetrating coaxially through the worm wheel 40. The engaging hole 40A serves as an engaging portion. The engaging shaft 34C tightly fits into (engages with) the engaging hole 40A, and the worm wheel 40 is supported at the engaging shaft 34C to be integrally rotatable therewith but movable in the axial direction. Upward movement of the worm wheel 40 is stopped by the flange 34D of the screw drive 34, and downward movement of the worm wheel 40 is stopped by the stop tube 26A of the case 22 (see FIG. 3B).

Helical inclined teeth 40B are formed coaxially at the outer periphery of the worm wheel 40. The inclined teeth 40B are angled in a direction to upward in the projecting direction. The worm wheel 40 (the inclined teeth 40B) is mated with the worm 30 (the worm tooth 30A). Thus, the worm 30 restricts rotation of the worm wheel 40. The worm 30 also restricts downward movement of the worm wheel 40, and restricts downward movement of the screw drive 34. When the worm 30 is rotated in the forward direction, the worm wheel 40 is rotated in the projecting direction and the screw drive 34 is rotated in the projecting direction. In addition, a movement force to downward (see FIG. 3B) is caused to act on the worm wheel 40 (the inclined teeth 40B) by the worm 30 (the worm tooth 30A). Conversely, when the worm 30 is rotated in the reverse direction, the worm wheel 40 is rotated in the retracting direction and the screw drive 34 is rotated in the retracting direction. In addition, a movement force to upward (see FIG. 3A) is caused to act on the worm wheel 40 (the inclined teeth 40B) by the worm 30 (the worm tooth 30A).

A slider 42 fabricated of a metal is coaxially engaged with the screw 36 of the screw drive 34. The slider 42 serves as a moving body. Profiles of an upper side part and a lower side part of the slider 42 are formed in, respectively, a substantially rectangular column shape and a circular column shape, and are arranged coaxially. A substantially circular screw hole 44 is formed penetrating coaxially through the slider 42. A helical thread groove 44A is formed coaxially at a periphery face of the screw hole 44. The thread groove 44A is angled in a direction to downward in the projecting direction. The screw 36 (the thread ridge 36A) is engaged by threading with the screw hole 44 (the thread groove 44A). Thus, the screw 36 penetrates through the slider 42. Substantially rectangular penetrating holes 42A are formed in a front portion and a rear portion of the upper side region of the slider 42. The penetrating holes 42A at the front side and rear side penetrate through the upper side part of the slider 42 in the vertical direction and are open to, respectively, the front side and rear side of the slider 42.

The slider 42 is accommodated in a shoe 46 with a substantially cuboid box shape that is fabricated of a resin. The shoe 46 serves as a coupling body. The interior of the shoe 46 is open to the right side. The upper side part of the slider 42 tightly fits into the shoe 46 in the front-and-rear direction, and the slider 42 substantially fits into the shoe 46 in the vertical direction. The screw 36 of the screw drive 34 penetrates through an upper wall and a lower wall of the shoe 46 to be movable in the vertical direction. The shoe 46 tightly fits into the rail 32 in the front-and-rear direction and the left-and-right direction. Thus, rotation of the shoe 46 around the vertical direction is restricted by the rail 32, and rotation of the slider 42 around the vertical direction is restricted by the shoe 46. Therefore, when the screw drive 34 is rotated in the projecting direction, the slider 42 and shoe 46 move (slide) upward, and when the screw drive 34 is rotated in the retracting direction, the slider 42 and shoe 46 move (slide) downward.

A pair of long, thin wires 48 fabricated of a metal are connected to the slider 42 and the shoe 46. The wires 48 serve as connecting members and are flexible. Each wire 48 penetrates through the penetrating hole 42A in the slider 42 and the upper wall of the shoe 46 to be movable in the vertical direction. The wire 48 penetrates through the upper wall of the rail 32 to be movable in the vertical direction, and projects to the upper side of the rail 32. A piece 48A in a tube shape with a hexagonal profile, which is fabricated of a metal, is fixed coaxially to a lower end portion (proximal end portion) of the wire 48. The piece 48A tightly fits in the vertical direction between the upper side part of the slider 42 and the lower wall of the shoe 46. Therefore, the piece 48A is movable in the vertical direction integrally with the slider 42 and the shoe 46. The pair of wires 48 (including the pair of pieces 48A) are moved upward when the slider 42 and shoe 46 are moved upward, and are moved downward when the slider 42 and shoe 46 are moved downward.

A buckle 50 that serves as a support portion is fixed to upper end portions (distal end portions) of the pair of wires 48. The buckle 50 is connected to the screw drive 34 via the pair of wires 48 (including the pair of pieces 48A), the slider 42 and the shoe 46. The buckle 50 is caused to stand up by the wires 48, and the tongue 20 is detachably attached to the buckle 50. A buckle switch 50A is provided at the buckle 50. The buckle switch 50A detects when the tongue 20 is attached to the buckle 50, and is electronically connected to the control device 16.

Now, operation of the present exemplary embodiment is described.

In the lift-up buckle device 10 with the structure described above, when no vehicle occupant is sitting on the seat (when the sitting sensor 14 does not detect a vehicle occupant sitting on the seat), the lower face of the shoe 46 abuts against the upper face of the case 22 and the buckle 50 is disposed at a lower, retracted position (see FIG. 2).

When a vehicle occupant sits on the seat (when the sitting sensor 14 detects that a vehicle occupant is sitting on the seat), under the control of the control device 16, the motor 28 is driven forward, and the output shaft 28B of the motor 28 and the worm 30 are rotated in the forward direction. Therefore, the worm wheel 40 and the screw drive 34 are rotated in the projecting direction, and the slider 42 and the shoe 46 are moved upward. As a result, the pair of wires 48 (including the pair of pieces 48A) are moved upward, and the buckle 50 is moved upward (projected) and disposed at an upper, projected position. Meanwhile, the webbing 18 is pulled out from the take-up device in opposition to an urging force of the urging mechanism, and the tongue 20 of the webbing 18 is attached to the buckle 50. Because the tongue 20 is being attached to the buckle 50 that is disposed at the projected position, the tongue 20 may be attached to the buckle 50 with ease.

When the tongue 20 has been attached to the buckle 50 (when the buckle switch 50A detects that the tongue 20 is attached to the buckle 50), the motor 28 is driven in reverse under the control of the control device 16, and rotates the output shaft 28B of the motor 28 and the worm 30 in the reverse direction. Therefore, the worm wheel 40 and the screw drive 34 are rotated in the retracting direction, and the slider 42 and the shoe 46 are moved downward. As a result, the pair of wires 48 (including the pair of pieces 48A) are moved downward, and the buckle 50 is moved downward (retracted) and disposed at the retracted position. Thus, because the tongue 20 is moved downward together with the buckle 50, the webbing 18 is applied to the vehicle occupant in a state in which slack of the webbing 18 is eliminated due to the urging force of the urging mechanism.

In this operation, when the worm 30 is rotated in the forward direction, the worm wheel 40 and the screw drive 34 are rotated in the projecting direction and the slider 42 is moved upward, at which time the slider 42 causes the screw drive 34 to move downward. The downward movement of the screw drive 34 is stopped by the lower wall of the support chamber 22B of the case 22 (see FIG. 3B and FIG. 4). Conversely, when the worm 30 is rotated in the reverse direction, the worm wheel 40 and the screw drive 34 are rotated in the retracting direction and the slider 42 is moved downward, at which time the slider 42 causes the screw drive 34 to move upward. The upward movement of the screw drive 34 is stopped by the upper wall of the support chamber 22B of the case 22, via the spacer 38 (see FIG. 3A and FIG. 4).

Figure 3B:
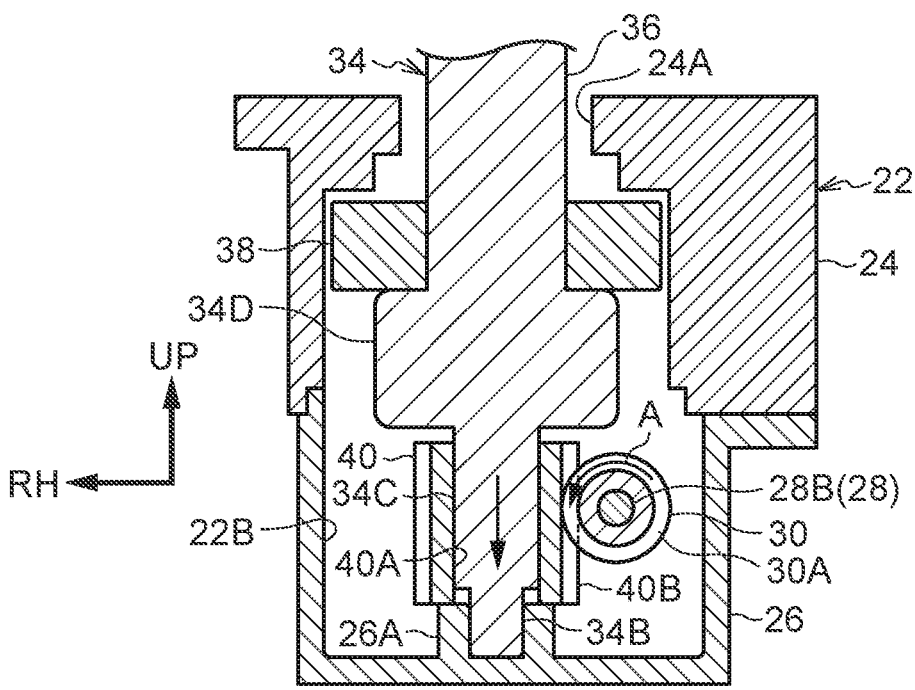
FIG. 3B is a sectional diagram seen from the front (a sectional diagram taken along line 3-3 in FIG. 2), showing the principal portions of the lift-up buckle device according to the exemplary embodiment of the present invention when the buckle is being projected.

When the worm 30 is rotated in the forward direction and the slider 42 moves the screw drive 34 downward, the worm 30 (the worm tooth 30A) causes the worm wheel 40 (the inclined teeth 40B) to move downward (see FIG. 3B and FIG. 4). Conversely, when the worm 30 is rotated in the reverse direction and the slider 42 moves the screw drive 34 upward, the worm 30 (the worm tooth 30A) causes the worm wheel 40 (the inclined teeth 40B) to move upward (see FIG. 3A and FIG. 4).

Therefore, when the slider 42 moves the screw drive 34 downward and when the slider 42 moves the screw drive 34 upward, the direction of movement of the screw drive 34 by the slider 42 and the direction of movement of the worm wheel 40 by the worm 30 may match. Thus, the worm wheel 40 (the engaging hole 40A) may be stably engaged with the screw drive 34 (the engaging shaft 34C), and the worm wheel 40 (inclined teeth 40B) and worm 30 (worm tooth 30A) may be stably mated.

When the worm 30 is rotated in the forward direction and the slider 42 moves the screw drive 34 downward, the downward movement of the worm wheel 40 by the worm 30 is stopped by the stop tube 26A of the case 22 (see FIG. 3B). Conversely, when the worm 30 is rotated in the reverse direction and the slider 42 moves the screw drive 34 upward, the upward movement of the worm wheel 40 by the worm 30 is stopped by the flange 34D of the screw drive 34 (see FIG. 3A).

Therefore, when the slider 42 moves the screw drive 34 downward and when the slider 42 moves the screw drive 34 upward, a reduction in an amount of engagement in the axial direction between the worm wheel 40 (the engaging hole 40A) and the screw drive 34 (the engaging shaft 34C) may be suppressed, and shaking of the worm wheel 40 relative to the screw drive 34 in the diametric direction thereof may be suppressed. Consequently, transmission losses of rotary loads from the worm 30 to the worm wheel 40 may be reduced, and driving force of the motor 28 may be moderated. In addition, sound pressure of sounds produced between the worm 30 and the worm wheel 40 may be reduced, and undulations caused by sound pressure variations of these sounds may be reduced.

As described above, the downward and upward movements of the worm wheel 40 by the worm 30 are stopped by, respectively, the stop tube 26A of the case 22 and the flange 34D of the screw drive 34. Therefore, a requirement to separately provide members that stop downward and upward movements of the worm wheel 40 may be eliminated, and structure may be simplified.

The slider 42 (the screw hole 44) is engaged by threading with the screw drive 34 (the screw 36), and the buckle 50 is connected with the screw drive 34 via the slider 42 and the wires 48. Therefore, there is no need to move the screw drive 34 in the vertical direction to move the buckle 50, and space needed for arrangement of the screw drive 34 may be reduced.

In the present exemplary embodiment, the worm tooth 30A of the worm 30 is angled in the direction toward the rear in the forward direction, the inclined teeth 40B of the worm wheel 40 are angled in the direction to upward in the projecting direction, and the thread ridge 36A of the screw drive 34 (the screw 36) and thread groove 44A of the slider 42 (the screw hole 44) are angled in the directions to downward in the projecting direction. Therefore, in the states in which the worm wheel 40 is being moved downward or upward, the worm wheel 40 is rotated in, respectively, the projecting direction or the retracting direction, and the slider 42 is moved, respectively, upward or downward by rotation of the screw drive 34 in, respectively, the projecting direction or the retracting direction. However, the worm tooth 30A of the worm 30 may be angled in a direction toward the front in the forward direction, the inclined teeth 40B of the worm wheel 40 may be angled in a direction to downward in the projecting direction, and the thread ridge 36A of the screw drive 34 (the screw 36) and thread groove 44A of the slider 42 (the screw hole 44) may be angled in a direction to upward in the projecting direction. Hence, in states in which the worm wheel 40 is being moved downward or upward, the worm wheel 40 may be rotated in, respectively, the retracting direction or the projecting direction, and the slider 42 may be moved, respectively, upward or downward by rotation of the screw drive 34 in the retracting direction or the projecting direction.

In the present exemplary embodiment, the worm wheel 40 is engaged to be integrally rotatable with the screw drive 34. However, the worm wheel 40 may be engaged by threading (engaged) with the screw drive 34, and the worm wheel 40 may be rotated to move the screw drive 34 in the axial direction. In this structure, the buckle 50 is connected with the screw drive 34, and the screw drive 34 is moved in the axial direction to move the buckle 50.

In the present exemplary embodiment, it is sufficient that the worm 30 and the worm wheel 40 are, respectively, a thread-form gear and a gear that mates therewith. The shape of the worm 30 may be suitably selected from a circular tube shape, a drum shape and the like, and the shape of the teeth of the worm wheel 40 may be suitably selected from a linear shape, a recessed circular arc shape and the like.

In the present exemplary embodiment, the support portion is the buckle 50. However, the support portion may be the take-up device, the through-anchor, the anchor or the tongue 20.

The disclosures of Japanese Patent Application No. 2019-125362 filed Jul. 4, 2019 are incorporated into the present Description by reference in their entirety.

EXPLANATION OF THE REFERENCE SYMBOLS

10 lift-up buckle device (webbing support device); 18 webbing; 26 cover (stopping body); 30 worm; 34 screw drive (engaging body); 40 worm wheel; 42 slider (moving body); 50 buckle (support portion)

The invention claimed is:

1. A webbing support device comprising:
a support portion configured to support a webbing to be applied to an occupant;
an engaging body connected with the support portion;
a worm wheel engaged with the engaging body; and
a worm directly mated with the worm wheel, rotation of the worm causing the worm wheel to rotate and, via the engaging body, causing the support portion to move, when a movement force to one axial direction side of the worm wheel is to act on the engaging body from a support portion side, the movement force to the one axial direction side being caused to act on the worm wheel by the rotation of the worm, and when a movement force to another axial direction side of the worm wheel is to act on the engaging body from the support portion side, the movement force to the other axial direction side being caused to act on the worm wheel by the rotation of the worm.

2. The webbing support device according to claim 1, wherein the engaging body stops a movement in an axial direction of the worm wheel by the worm.

3. The webbing support device according to claim 1, further comprising a stopping body that supports the engaging body and stops a movement in an axial direction of the worm wheel by the worm.

4. The webbing support device according to claim 3, wherein the stopping body stops a movement of the engaging body in the axial direction of the worm wheel.

5. The webbing support device according to claim 1, further comprising a stopping member that stops a movement of the engaging body in an axial direction of the worm wheel.

6. The webbing support device according to claim 1, further comprising a moving body that is connected with the support portion and engaged by threading with the engaging body, the moving body being moved and moving the support portion when the worm wheel is rotated and rotates the engaging body.

7. The webbing support device according to claim 1, wherein the worm wheel is movable in an axial direction relative to the engaging body.

* * * * *